(12) United States Patent
Omatsu

(10) Patent No.: US 7,860,761 B2
(45) Date of Patent: Dec. 28, 2010

(54) CODE MANAGEMENT SYSTEM

(75) Inventor: Shigehisa Omatsu, Chiba (JP)

(73) Assignee: Consumers Co-Operative Sapporo, Hakkaido (JP)

( * ) Notice: Subject to any disclaimer, the term of this patent is extended or adjusted under 35 U.S.C. 154(b) by 293 days.

(21) Appl. No.: 12/084,898

(22) PCT Filed: Nov. 14, 2006

(86) PCT No.: PCT/JP2006/322606

§ 371 (c)(1),
(2), (4) Date: May 13, 2008

(87) PCT Pub. No.: WO2007/058154

PCT Pub. Date: May 24, 2007

(65) Prior Publication Data

US 2009/0234756 A1 Sep. 17, 2009

(30) Foreign Application Priority Data

Nov. 15, 2005 (JP) ............................. 2005-330334

(51) Int. Cl.
*G06Q 10/00* (2006.01)
*G06Q 20/00* (2006.01)
*G01G 19/22* (2006.01)

(52) U.S. Cl. .............................. 705/28; 705/23; 177/25

(58) Field of Classification Search .................... None
See application file for complete search history.

(56) References Cited

U.S. PATENT DOCUMENTS 4,153,122 A * 5/1979 Engels et al. ............ 177/25.15
6,400,752 B1 * 6/2002 Suzuki et al. ................ 375/133

(Continued)

FOREIGN PATENT DOCUMENTS

JP A-10-245023 9/1998

(Continued)

OTHER PUBLICATIONS

PCT International Search Report mailed on Dec. 19, 2006 for the corresponding International patent application No. PCT/JP2006/322606.

(Continued)

*Primary Examiner*—F. Ryan Zeender
*Assistant Examiner*—Denisse Ortiz Roman
(74) *Attorney, Agent, or Firm*—Posz Law Group, PLC

(57) ABSTRACT

A code management system is provided for reducing an amount of data on a product identification number assigned to a product in traceability system and enabling to reduce an information management burden required for a history reference. In a weighing label attaching process, a main server distributes unused individual product code complying with a request from a weighing machine. The weighing machine creates and stores a weighing related information that relates a case code previously read to a weighing result (weight), a calculating result (price), a label code (a product identification information) determined as any of individual product codes, and a content of a label information. The main server requires the weighing related information to provide, complying with a request submitting the label code from a purchaser of the product. The weighing machine searches and transmits the weighing related information to the main server complying with the request from the main server.

8 Claims, 6 Drawing Sheets

100: CODE MANAGEMENT SYSTEM

U.S. PATENT DOCUMENTS

2005/0131763 A1* 6/2005 Junger .................... 705/23

FOREIGN PATENT DOCUMENTS

| JP | A-2003-196743 | 7/2003 |
|----|---------------|--------|
| JP | A-2004-342097 | 12/2004 |
| JP | A-2005-202475 | 7/2005 |
| KR | 2002-31672 | 5/2002 |
| KR | 2005-103135 | 10/2005 |

OTHER PUBLICATIONS

Notification of Opinion Submission issued on Feb. 22, 2010 by the Korean Patent Office in corresponding Korean Application No. 10-2008-7011283 (English translation enclosed).

* cited by examiner

FIG.4

INDIVIDUAL PRODUCT CODE DISTRIBUTION INFORMATION

| INDIVIDUAL PRODUCT CODE | DISTRIBUTED WEIGHING MACHINE NUMBER |
|---|---|
| 00000000001 | 010203 |
| 00000000002 | 010203 |
| 00000000003 | 010203 |
| ⋮ | ⋮ |

FIG.5

WEIGHING RELATED INFORMATION (WEIGHING MACHINE NUMBER(0203))

| LABEL CODE (INDIVIDUAL PRODUCT CODE) | CASE CODE | WEIGHT | PRICE | SELL-BY DATE | ....... |
|---|---|---|---|---|---|
| 00000000001 | * * * * * * | 200g | 600YEN | 19:00,1/12/2005 | ....... |
| 00000000002 | * * * * * * | 220g | 660YEN | 19:00,1/12/2005 | ....... |
| 00000000003 | * * * * * * | 215g | 645YEN | 19:00,1/12/2005 | ....... |
| ⋮ | ⋮ | ⋮ | ⋮ | ⋮ | ⋮ |

CODE MANAGEMENT SYSTEM

CROSS REFERENCE TO RELATED APPLICATIONS

The present application is a PCT National Stage of PCT Application No. PCT/JP2006/322606, filed on Nov. 14, 2006, and claims priority to and incorporates by reference Japanese Patent Application No. 2005-330334, filed on Nov. 15, 2005.

BACKGROUND

The present invention relates to a code management system that assigns a product identification code to a product so as to identify the product uniquely, and manages the product identification code that is assigned to the product, in order to provide the history information of the product in traceability systems.

Recently, traceability systems that provide to a consumer who purchased particular vegetables and meats, a production and distribution history of the vegetables and meats, are implemented through a communication network such as the Internet.

In traceability systems, the production and distribution history of products such as vegetables and meats can be searched and browsed by making a code (a label code), to be used as a search key, that is printed on a product label (label) and attached on a container such as a pack in which the product is contained.

A related example of prior art in which a label code is assigned to a product and managed in a traceability system is Patent document 1: Japanese Patent Application Publication No. 2005-202475.

In the conventional art described in patent document 1 mentioned above, there has been a problem that the information management burden of the management server that manages the necessary information for the history reference in traceability systems become enormous, since the product identification number (the label code) is determined by listing a date, a machine number (a weighing machine number) and so on, and the digit number of the label code used in traceability systems increases.

Therefore, there is a need to solve the problem described above and to provide a code management system that reduces an amount of data of a product identification number assigned to identify a product in traceability systems, and reduces an information management burden of a management server that manages necessary information for a history reference in traceability systems.

SUMMARY

An exemplary code management system is a code management system (for example, a code management system 100) that assigns a product identification code to a product to identify the product uniquely and manages the assigned product identification code, and is characterized by determining a product identification code from among unused individual product codes to identify the product uniquely, attaches a product label on which the determined product identification code is written on a product package, stores a product label related information that is at least a part of information written on the product label and includes the product identification code, and transmits the product label related information that includes such product identification code as part or all of a history information to a terminal through a communication network, complying with a request of the history information of the product by submitting the product identification code from the terminal.

By configuring as described above, the code management system can be provided in which the amount of data of the product identification code assigned to identify the product in traceability systems is reduced, and the information management burden of the necessary information for the history reference in traceability systems can be reduced.

The code management system can be configured to include a label attaching apparatus (for example, a weighing machine 41) that attaches a product label on a product package and an individual product code management server (for example, an individual product code distribution server 10) that manages an individual product code to identify each of products uniquely. The label attaching apparatus can be configured to include an individual product code requester (for example, an individual product code requester 412) that requests to the individual product code management server to obtain an individual product code by submitting an apparatus number (for example, a weighing machine number) by which the label attaching apparatus can be identified, an individual product code obtainer (for example, a CPU and a data communicator 413 included in a weighing machine 41) that obtains the individual product code from the individual product code management server through the communication network, a product identification code determiner (for example, a label code determiner 418) that determines the individual product code obtained by the individual product code obtainer as a product identification code (for example, a label code) to identify the product uniquely, a product label attacher (for example, a label attacher 420) that attaches a product label on which the product identification code determined by the product identification code determiner is written on a product package, a product label related information storer (for example, a weighing machine database 424) that stores a product label related information that is at least a part of information written on the product label and includes the product identification code, and a product label related information transmitter (for example, the CPU and the data communicator 413 included in the weighing machine 41) that transmits the product label related information that includes such product identification code through the communication network complying with a history information obtaining request that submits the product identification code. The individual product code management server can be configured to include an individual product code transmitter (for example, a section that carries out a step S103 in a CPU that is included in the individual product distribution server 10) that transmits an unused individual product code complying with an obtaining request by the individual product code requester, an individual product code distribution information storer (for example, a database included in the individual product code distribution server 10) that stores an individual product code distribution information that matches an apparatus number that indicates the label attaching apparatus submitted by the individual product code requester and an individual product code transmitted by an individual product code transmitter, a history information obtaining requester (for example, the CPU included in the individual product code distribution server 10) that requests to obtain a history information by submitting the submitted product identification code for the label attaching apparatus when a history information provision request from a terminal apparatus (for example, a consumer terminal 70) by submitting the product identification code is received through the communication network, and a history information provider (for example, the CPU included in the individual product code distribution server 10) that provides the product label related information transmitted by the product label related information transmitter for the terminal apparatus as part or all of the history information.

By configuring as described above, the code management system can be provided in which the amount of data of the product identification code assigned to identify the product in traceability systems is reduced, and the information management burden in a management server that manages the necessary information for the history reference in traceability systems can be reduced.

It is preferable that the individual product code transmitter transmits a plurality of individual product codes all at once, and the product identification code determiner determines any of unused individual product codes among the plurality of individual product codes obtained all at once by the individual product code obtainer as the product identification code to identify the product uniquely. By configuring in this manner, the product identification code can be assigned promptly and smoothly to each of the plurality of similar products.

It is preferable that the code management system includes a product information server (for example, a product master server 20) that manages the product information that includes a unit price of the product, the label attaching apparatus includes a case code reader (for example, a case code reader 411) that reads a case code written on a case that goods intended to be the product is contained, a product information requester (for example, a product master data requester 414) that requests to obtain a product information by submitting the case code read by the case code reader to the product information server, a product information obtainer (for example, the CPU and the data communicator 413 included in the weighing machine 41) that obtains the product information from the product information server through the communication network, and a price calculator (for example, a price calculator 417) that calculates a price based on the unit price of the product indicated by the product information obtained by the product information obtainer and a weighing result of such product, the product label attacher attaches the product label on which the price that is calculated by the price calculator is written on the product package, the product label related information storer stores the product label related information that includes the price calculated by the price calculator. By configuring in this manner, the price can be included in the necessary information for the history reference in traceability systems.

The case code is a production code (an individual identification number) that can identify, for example, a production information of the goods intended to be the product (for example, a place of production, a producer etc.)

The product includes, for example, a meat product that a subprimal of an individual food animal (for example, swine, cattle, mutton, and poultry etc.) is dressed, a dressed meat product that includes a plurality of individual food animals (for example, minced meat), a seafood product that a marine product (for example, fish, and shellfish etc.) is dressed or divided, a greengrocery product that fruit and vegetable product (for example, vegetable and fruit) is cut or divided, and a beverage product that beverage is divided into a beverage container.

According to the above exemplary embodiment, an amount of data of a product identification code assigned to identify a product in traceability systems can be reduced, and a code management system that can reduce an information management burden in a management server that manages the necessary information for a history reference in traceability systems can be provided.

BRIEF DESCRIPTION OF THE DRAWINGS

FIG. 4 is an explanatory drawing that shows an example of individual product code distribution information.

FIG. 5 is an explanatory drawing that shows an example of a weighing related information.

DETAILED DESCRIPTION

Hereinafter, an exemplary embodiment will be described with reference to the drawings. In order to simplify the explanation, the description mentioned below describes mainly when a subprimal of an individual raw swine and dressed meat product such as minced meat that is mixed subprimals of a plurality of individual raw swines are weighed and the label code is assigned to such subprimal and such dressed meat product.

Figure 1:
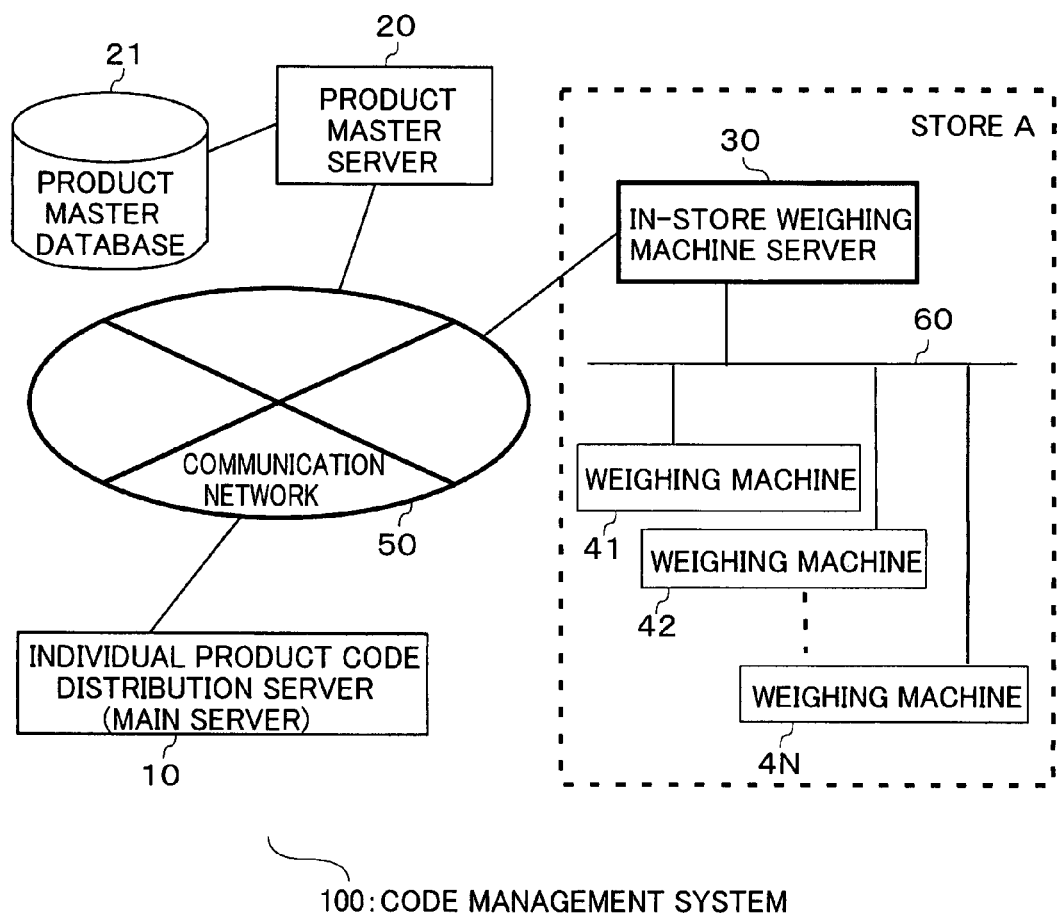
FIG. 1 is a block diagram that illustrates a configuration of a code management system to which an exemplary embodiment is applied.

FIG. 1 is a block diagram that illustrates a configuration of a code management system 100 to which an exemplary embodiment is applied. As shown in FIG. 1, the code management system 100 includes an individual product code distribution server 10, a product master server 20, an in-store weighing machine server 30, and weighing machines 41-4N (N: random positive integer.)

The individual product code distribution server 10, the product master server 20 and the in-store weighing machine server 30 is connected respectively to a communication network 50, for example internet etc. Also, each of the in-store weighing machine server 30 and weighing machines 41-4N are connected respectively to a communication network 60, for example LAN etc., that is arranged in store A, for example.

In this regard, although the in-store weighing machine server 30 and weighing machines 41-4N placed in store A are shown in FIG. 1, an in-store weighing machine server and a weighing machine placed in another store managed by a store general manager that manages a plurality of stores including store A can be included in the code management system 100. Also, although one product master server 20 is shown in FIG. 1, a plurality of product master servers managed respectively by a number of store general managers can be included in the code management system 100.

Each of the individual product code distribution server 10, the product master server 20 and the in-store weighing machine server 30 are configured with an information processing apparatus such as www server.

The individual product code distribution server 10 is a main server that is managed by a system manager of the code management system 100, for example, and executes various kinds of processing such as an individual product code distribution processing and a provision processing of the history information in traceability systems.

The product master server 20 is managed by a store general manager, for example, that manages a plurality of stores including store A, and includes a product master database 21 in which a product master including various kinds of product information on each products that are sold in each managed stores is stored. The product master includes various kinds of product information on each products, for example a case code assigned on a case that is used when the product is carried out from a place of production, a product name, a unit price (a price per unit weight, a price per unit), a producer, and a place of production. In this regard, the product master database 21 can be placed either inside or outside the product master server 20.

The in-store weighing machine server 30 is managed by a store manager that manages store A, for example, and exchanges information with the individual product code distribution server 10 and the product master server 20 etc. through a communication network 50 as well as exchanges information with each of weighing machines 41-4N through a communication network 60.

Each of weighing machines 41-4N has, in addition to a function of weighing a product such as meat, vegetable, fish and egg etc., a function of cutting (dressing and dividing) meat and vegetable etc., a function of attaching a label on which a product identification number (a label code) assigned to identify the product in traceability systems is written on the product, and a function of managing part of a history information referred in traceability systems, etc. Also, since each of weighing machine 41-4N has identical structure, a weighing machine 41 is described mainly in the description below.

Figure 2:
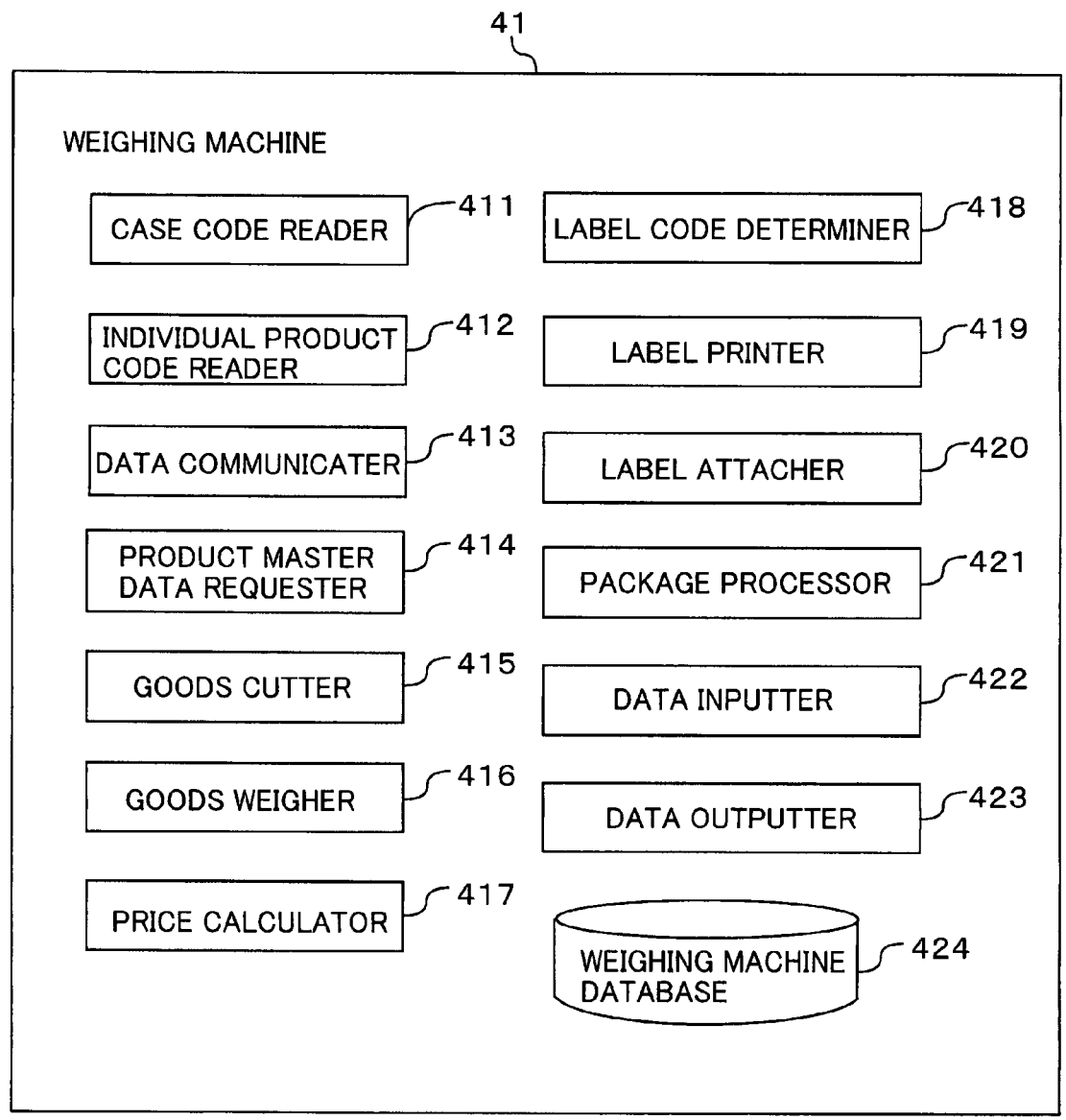
FIG. 2 is a block diagram that illustrates a configuration of a weighing machine.

FIG. 2 is a block diagram that illustrates a configuration of the weighing machine 41. As shown in FIG. 2, the weighing machine 41 includes a case code reader 411, an individual product code requester 412, a data communicator 413, a product master data requester 414, a goods cutter 415, a goods weigher 416, a price calculator 417, a label code determiner 418, a label printer 419, a label attacher 420, a package processor 421, a data inputter 422, a data outputter 423 and a weighing machine database 424.

Also, a control program to cause each unit 411-423 that configures the weighing machine 41 to execute various kinds of processing is stored in a storage media such as ROM etc. included in the weighing machine 41.

The weighing machine 41 includes a transport route along which the goods (products) intended to be processed are transported, and a transport mechanism to transport the goods on the transport route in order to perform the various kinds of processing sequentially.

The case code reader 411 includes a function of reading a code (a case code) written on a case in which the goods such as food meat are contained when the goods are carried into a store. In particular, the case code reader 411 is configured of a bar-code reader when the case code is written in bar-code, and configured of a tag-reader when the case code is stored in a RFID (Radio Frequency Identification) tag.

The individual product code requester 412 performs a processing to request an assignable individual product code to the individual product code distribution server 10. The data communicator 413 includes a function of exchanging various kinds of data through communication networks 50 and 60.

The product master data requester 414 performs a processing to request for the product master server 20 to provide part or all of the product information indicated by the product master.

The goods cutter 415 performs a processing of cutting a received subprimal, and of dressing one or more individual raw meat into minced meat etc. and so on. Also, a person in charge in the store can be allowed to perform a cutting operation such as cutting a subprimal etc., and a dressing operation such as dressing the subprimal into minced meat etc. In this instance, there is no need to equip the goods cutter 415.

The goods weigher 416 includes a placing table on which the product is placed, and performs a processing of weighing the product placed on the placing table. The product can be placed on the placing table either by the transport mechanism that transports the product automatically or by a person in charge in the store. The price calculator 417 performs a processing of calculating a product price based on the weighing result of the goods weigher 416.

The label code determiner 418 performs a processing of determining a code (a label code) to print on a label. The label printer 419 includes a printing mechanism such as a print head, and performs a processing of printing a label information including the label code on the label. Also, when an IC tag is used as the label, the label printer 419 is configured of an IC tag writer.

The label attacher 420 performs a processing of attaching a label on which the label information is written on a package media for packing a product (for example, a package container and a package cover.) The package processor 421 performs a processing of packing the product by using the package media to which the label is attached.

The data inputter 422 is configured of an input device such as a keyboard, and includes a function of inputting various kinds of information into the weighing machine 41. The data outputter 423 is configured of a display unit, for example a liquid-crystal display etc., and includes a function of displaying various kinds of information.

The weighing machine database 424 is configured of a storage media, for example RAM etc., and stores various kinds of information such as a weighing related information mentioned below (see FIG. 5) that is part of information used for a history reference in traceability systems.

Next, an operation of the code management system 100 in the present embodiment is described. Here, a processing until the goods that is carried in store A are processed and packed per unit product by the weighing machine 41 is described. And here, also, in order to simplify the explanation, an instance that a subprimal B of a raw swine is dressed and weighed and a label on which a label code is printed is attached on a package is described, and the explanations for any process other than the processes relating to the present invention particularly may be omitted.

Figure 3:
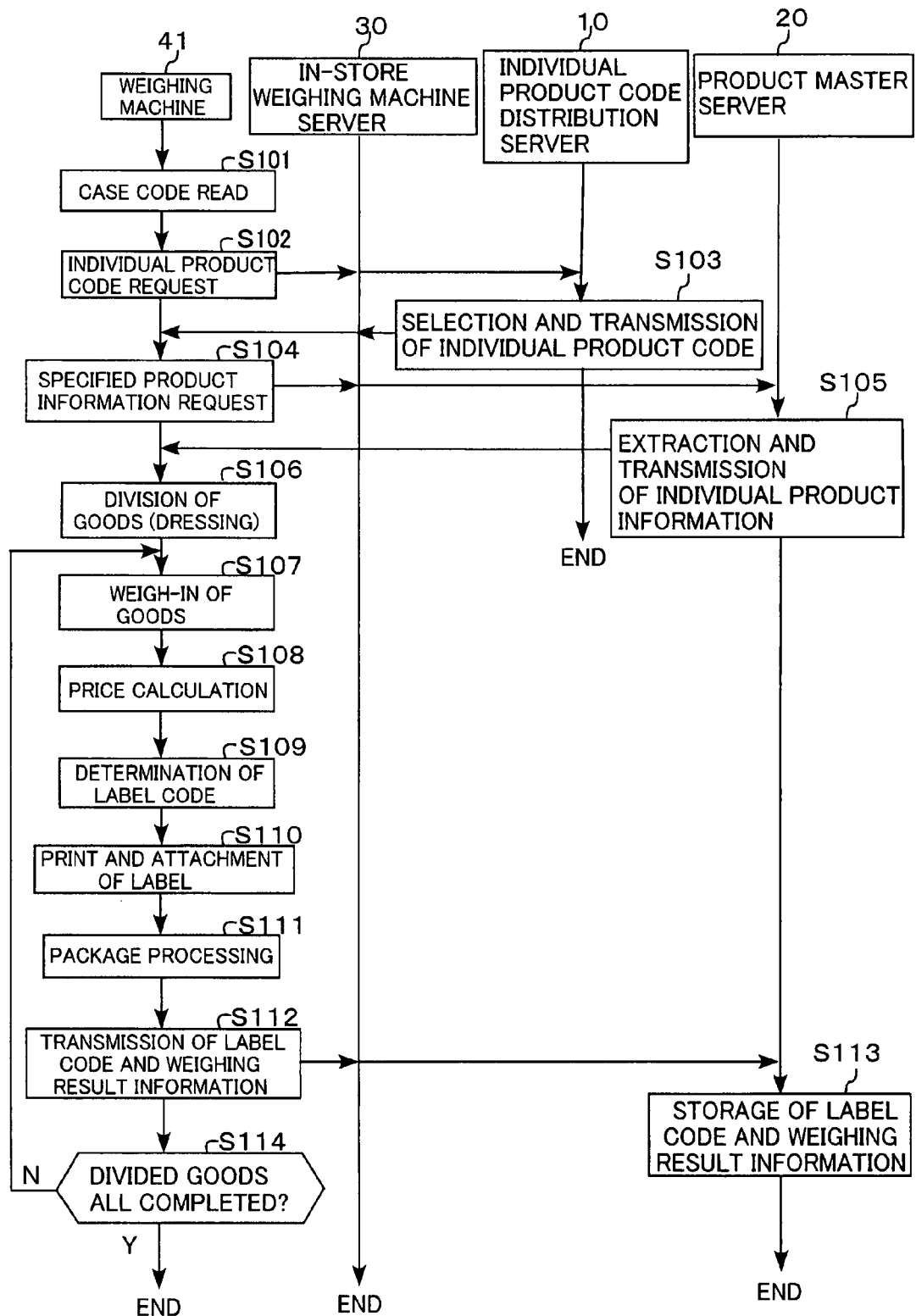
FIG. 3 is a flowchart that illustrates a weighing label attaching process.

FIG. 3 is a flowchart illustrates a weighing label attaching process in the code management system 100 in the present embodiment. First, a case code reader 411 reads a case code that is written on a case that contains a subprimal B of a raw swine, and stores the read case code in a weighing machine database 424 (step S101). It is assumed that the case code is an individual identification number of pertinent raw swine here. Also, when subprimals of a plurality kinds of raw swine contained in more than one case is used, the case code reader 411 reads each of the case codes written on each cases.

Second, an individual product code requester 412 submits a weighing machine number to identify the weighing machine 41 uniquely, and requests a distribution of a usable individual product code through a communication network 60, an in-store weighing machine server 30 and a communication network 50, to an individual product code distribution server 10 (step S102).

Receiving a request from the weighing machine 41, the individual product code distribution server 10 selects a predetermined number of individual product codes that are not used yet in the code management system 100, and transmits them all at once for the weighing machine 41 (step S103). In the present embodiment, the individual product code distribution server 10 selects and transmits twenty individual product codes, for example. The number of the individual product code to be selected is predetermined at every weighing machine that intended to be a distribution, for example. In this regard, the same number of the individual product code can be distributed to all of the weighing machines. Also, the predetermined number of the individual product code at every weighing machine that intended to be the distribution can be either a fixed number or an unfixed number. When the unfixed number is used, a parameter for determining the number of individual product code can be changed depending on a usage (an operation rate) of the intended weighing machine.

Distributing the selected individual product codes to the weighing machine 41, the individual product code distribution server 10 updates an individual product code distribution information as shown in FIG. 4, for example. That is, the individual product code distribution server 10 matches the distributed individual product code and the weighing machine number for identifying the weighing machine 41 that is a distribution, and stores the information as the individual product code distribution information. The individual product code distribution information is stored in a database of the individual product code distribution server 10.

The weighing machine 41 obtains the predetermined number of unused individual product codes from the individual product code distribution server 10 by means of the data communicator 413 through the communication network 50, the in-store weighing machine server 30 and the communication network 60.

After that, the product master data requester 414 submits the case code that is read at the step S101, and requests a specified product information on a product specified by the case code to the product master server 20 through the communication network 60, the in-store weighing server 30 and the communication network 50 (step S104). The specified product information means is specified information that is included in a product information that the product master indicates, and, in the present embodiment, is assumed to be the information that includes a unit price of the product and the product name.

The product master server 20 extracts the specified product information on the product specified by the received case code from the product master that is stored in the product master database 21, and transmits the specified product information to the weighing machine 41, complying with the request from the product master data requester 414 (step S105).

The weighing machine 41 obtains the specified product information from the product master server 20 by means of the data communicator 413 through the communication network 50, the in-store weighing machine server 30 and the communication network 60. That is, the weighing machine 41 obtains the specified product information including the product name and the unit price of the subprimal B that is specified by the case code.

Next, in the present embodiment, the goods cutter 415 performs a processing of dressing the subprimal B and dividing it into product, units (step S106).

After dividing the meat into the product units, the goods weigher 416 weighs the product per product unit, matches the weighing result and the pertinent case code and stores the weighing result in the weighing machine database 424 (step S107).

Based on the weighing result of the goods weigher 416 and the unit price of the product that is included in the obtained specified product information, the price calculator 417 calculates a price of the weighed product, matches the calculating result and the pertinent case code and stores the calculating result in the weighing machine database 424 (step S108).

And, the label code determiner 418 determines the label code assigned to the product by allocating any of the unused individual product code among a plurality of the individual product codes distributed by the individual product code distribution server 10 to the product intended to be processed (step S109). That is, any of a plurality of the individual product codes obtained from the individual product code distribution server 10 becomes a label code assigned to the product intended to be processed. In this regard, a determination result of the label code is matched to the pertinent case code and is stored in the weighing machine database 424 by means of the label code determiner 418.

After the label code is determined, the label printer 419 prints a label information such as the label code on a label, and the label attacher 420 attaches the label on which the label information is printed on a package media (step S110).

The label information includes various kinds of information, for example the label code, current date and hour, the product name, a weight of the product, a price of the product, a name of the store, sell-by date, use-by date, a place of production, etc.

And, the package processor 421 packs the product intended to be processed with the package media on which the label is attached (step S111).

Further, the weighing machine 41 transmits the label code and a weighing related information to the product master server 20 (step S112). The product master server 20 saves the received label code and the weighing related information (step S113).

And, when a processing of one unit of the product among a plurality of the products intended to be the product units, until packing, is completed, if any of the products intended to be processed remains, the weighing machine 41 returns to the step S107 (step S114). By executing a processing from the step S107 to the step S114 repeatedly, a processing from weighing to packing for all of a plurality of products intended as the product units is completed.

In this regard, instead of executing a processing from the step S107 to the step S112 per product sequentially, the processing from the step S107 to the step S112 can be executed per processing step sequentially. That is, it can be configured that, for example, weighing a product A is performed, weighing a product B and calculating a price of the product A is performed, and then weighing a product C, calculating the price of the product B and determining a label code of the product A is performed. A processing procedure of a plurality of the products may be determined in any order as long as each product can be processed from weighing to packing.

In a weighing label attaching process described above, the weighing machine 41 in the present embodiment creates the weighing related information by sequentially relating the case code read at the step S101 to the weighing result (weight) at the step S107, the calculation result (price) at the step S108, the label code determined at the step S109, the contents of the label information such as the sell-by date other than the label code printed at the step S110, etc. Therefore, by executing the weighing label attaching process described above, the weighing related information as shown in FIG. 5, for example, stored in the weighing machine database 424 is created.

In this regard, although the weighing label attaching process described above is defined that the goods contained in a case are performed weighing etc. after dividing, the goods contained in the case can be processed as one product without dividing.

Also, although the weighing label attaching process described above is defined as a configuration that a predetermined number of the individual product codes is distributed all at once and assigned as the label codes on each products of the divided goods, if the number of the divided goods is smaller than that of the individual product codes, the individual product codes that is not used in this process can be informed to the individual product code distribution server 10. By configuring in this manner, since the individual product codes that is not used in this process is allowed to be treated as the unused individual product codes in the individual product code distribution server 10, the individual product codes can be distributed effectively. In this regard, if the number of the divided products is larger than that of the individual product codes, an additional distribution of the individual product code can be requested to the individual product code distribution server 10.

Figure 6:
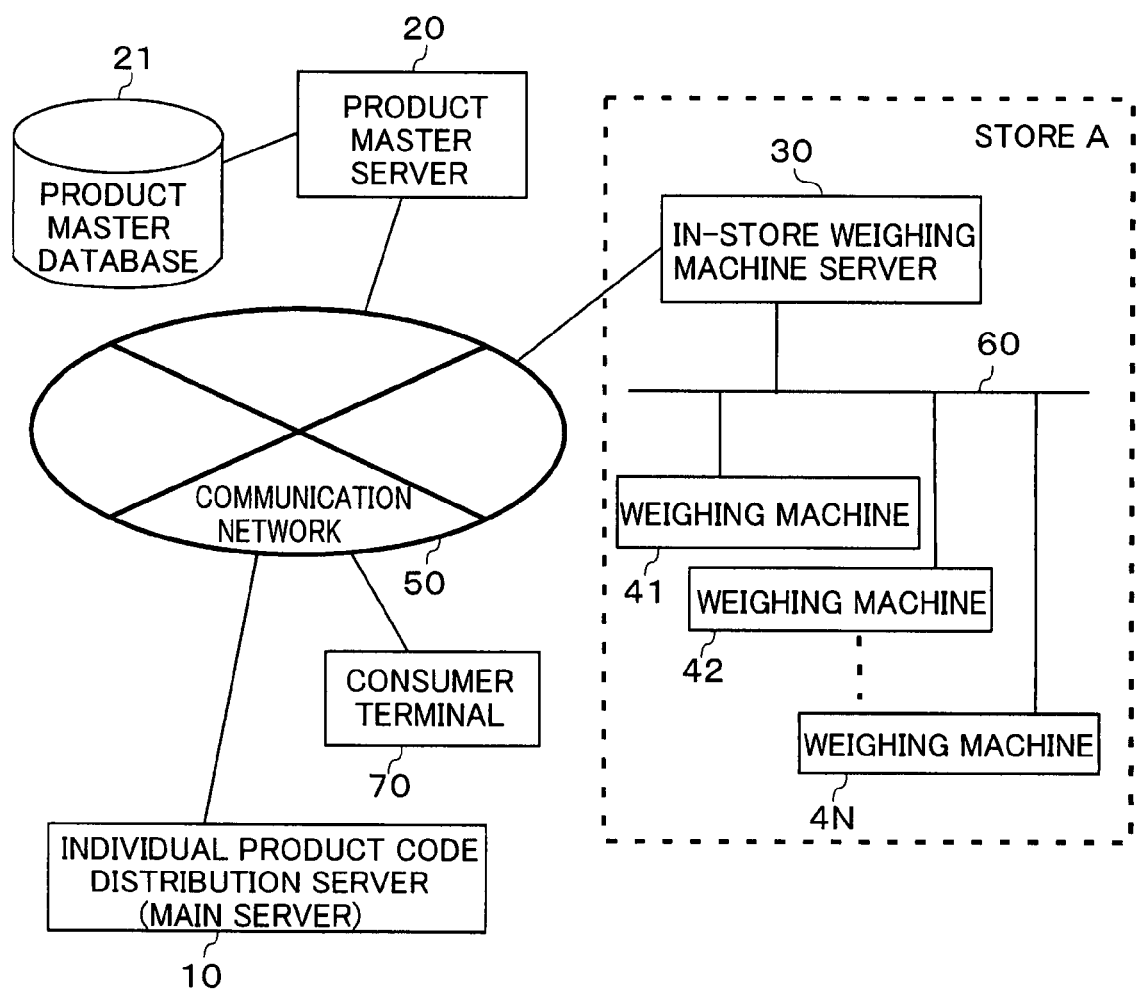
FIG. 6 is a block diagram that illustrates a history reference system that includes a consumer terminal used by a consumer that purchased a product.

Next, a history providing process based on the history reference of the product in traceability systems is described. FIG. 6 is a block diagram that illustrates a history reference system including a consumer terminal 70 that is used by the consumer purchased the product. In this regard, in FIG. 6, an identical component of the system 100 shown in FIG. 1 is assigned a sign that is identical to that of the system 100 and omitted detailed description.

The consumer terminal 70 is configured of an information processing apparatus, for example a personal computer and a handheld terminal, and includes an environment that includes a software and a hardware to connect to the communication network 50.

Here, as an example, a case when a consumer X that purchased a product Y requests the history reference of the product Y using the consumer terminal 70 is described.

First, the consumer terminal 70 accesses a main server 10 and submits the label code written on the label that is attached on the product Y, complying with an operation of the consumer X.

Receiving a history reference request with submitting the label code, the main server 10 refers to an individual product code distribution information (FIG. 4) that is stored in a database included in the server, searches a distribution weighing machine number that is matched to the submitted label code (individual product code), and identifies the weighing machine that performed a processing of weighing etc. of the product Y by the searched distribution weighing machine number. Here, the weighing machine 41 is assumed to be identified.

Second, the main server 10 submits the label code that is submitted from the consumer terminal 70 to the identified weighing machine 41, and requests to obtain the weighing related information. Then, complying with the request from the main server 10, the weighing machine 41 extracts the weighing related information including the submitted label code and transmits the information to the main server 10.

Receiving the weighing related information, the main server 10 searches a production information that includes an information of a place of production, a producer etc. with the case code (the individual identification number) that is included in the received weighing related information. The production information is matched to the case code, for example, and is stored in the database that is included in the main server 10. In this regard, the production information can be managed by another server, and in this case, the main server 10 refers to the server that manages the production information by using the case code as a key and obtains the production information on the product Y from the server.

And the main server 10 provides part or all of the information that is indicated in the obtained weighing related information as part or all of a distribution history, and provides part or all of the obtained production information as part or all of a production history, to the consumer terminal 70.

Also, by keeping the weighing related information at the main server 10, a process to obtain the weighing related information from the weighing machine 41 may be omitted when the history reference request is received.

As explained above, in one embodiment described above, since the code management system 100 includes the weighing machine 41 that obtains the individual product code from the individual product code distribution server 10 through the communication networks 50 and 60 by requesting for obtaining the individual product codes, with submitting the weighing machine number, to identify each products uniquely to the individual product code distribution server 10, determines the obtained individual product code as the label code that is to be assigned to the product intended to be processed, attaches the label on which the determined label code is written on the product package, further, stores the weighing related information including the label code, and provides such weighing related information including the label code to the individual product code distribution server 10 through the communication networks 50 and 60, complying with the obtaining request of the history information in which the label code is submitted from the individual product code distribution server 10 that manages the individual product code distribution information that matches the individual product code and the weighing machine number that indicates the weighing machine that is the distribution of such individual product code, the amount of data of the label code that is allocated to identify the product in traceability systems can be significantly reduced, and the code management system 100 that can reduce a information management burden of the individual product code distribution server 10 that manages the necessary information for the history reference in traceability systems can be provided.

That is, since it is sufficient as long as the digit number of the label code is ready enough to cover the number of the products handled by the whole system, and it is no need to include the information of a date and the individual identification number etc. in the information on the label code, an amount of data of the label code can be significantly reduced. Therefore, a necessary storage capacity of a storage media in which the label code is stored can be decreased, and the processing burden that occurs when the label code is transmitted on the communication network, and a search processing load that occurs from a search with the label code as a key, can be reduced.

Also, since one embodiment described above is configured to obtain a plurality of the individual product codes from the individual product code distribution server 10 all at once and determine any of the unused individual product codes among the plurality of obtained individual product codes as the label codes that are assigned to the product intended to be processed, the label codes can be assigned to each of the plurality of similar products promptly and smoothly.

Also, since one embodiment described above is configured to obtain a specified product information from the product master server 20 through the communication networks 50 and 60, by reading the case code written on the case that contains the goods intended to be the product and requesting to obtain the specified product information by submitting the read case code, calculate the price based on the unit price of the product indicated in the obtained specified product information and the weighing result of the product, attach the label on which a calculated price is written on the product package, and store the weighing related information including the calculated price, the price can be included in the necessary information for the history reference in traceability systems.

In this regard, although, in one embodiment described above, the case that the subprimal of an individual raw swine and the dressed meat products such as the minced meat that is mixed the subprimals of a plurality of individual raw swines are weighed and the label codes are assigned to such subprimals and such dressed meat products is described mainly, with regard to the product, the case that a food animal other than swine (for example, cattle, mutton, poultry and marine product (for example, fish, shellfish, etc.) etc.) becomes the product can be applied, and the case that other foods such as eggs and greengrocery (for example, vegetables and fruits) etc. become the products can also be applied. For example, when the product is marine product, the label code is assigned to the product of a processed fish that is dressed, etc. and that of fishes or shellfishes that are divided per predetermined number or per predetermined weight. Also, when the product is a vegetable or a fruit, the label code is assigned to the product of processed vegetable and fruit that is dressed, etc. (for example, cut fruit) and that of vegetables and fruits product that are divided per predetermined number or per predetermined weight. In this regard, beverage also can be the product, and in this instance, the label code is assigned to a beverage product (product) that beverage is divided into a beverage container (for example, bottle and pack).

Also, although, in one embodiment described above, the case code is the individual identification number, any type of code will do as long as the production information of the pertinent product can be identified by the code.

Further, although, in one embodiment described above, the processing of determining the price, determining the label code, printing the label, attaching the label, packing, etc. is performed as well as weighing by the weighing machine 41-4N, a part of each processing can be performed by another apparatus. In this regard, if a processing of weighing in the weighing machine 41-4N is performed by another apparatus, an apparatus from which a weighing function of the weighing machine 41-4N is removed can be called a label attaching apparatus, for example.

The embodiments described above can be applied to a code management system that performs an assignment and a management of a label code in order to reduce an amount of data of a product identification number that is assigned to identify a product in traceability systems, and reduce an information management burden in a management server that manages a necessary information for a history reference in traceability systems. Therefore, the present invention as illustrated by the above exemplary embodiments is useful.

What is claimed is:

1. A code management system that assigns a product identification code to a product to identify the product uniquely, and manages the product identification code that is assigned to the product, in order to provide history information of the product in traceability systems, the code management system comprising:

one or more label attaching apparatus configured to attach a product label on a product package of a product, a different apparatus number being assigned to each of the one or more label attaching apparatus; and an individual product code management server configured to manage individual product codes for identifying each of products uniquely, wherein each of the one or more label attaching apparatus includes:

an individual product code requester configured to submit an obtaining request to obtain an individual product code to the individual product code management server by submitting an apparatus number of the label attaching apparatus by which the label attaching apparatus can be identified;

an individual code obtainer configured to obtain the individual product code from the individual product code management server through a communication network;

a product identification code determiner configured to determine that the individual product code obtained by the individual product code obtainer is assigned to the product as a product identification code for identifying the product uniquely;

a product label attacher configured to attach a product label, on which the product identification code determined by the product identification code determiner is written, onto the product package of the product; and a product label related information storer configured to store product label related information that is at least a part of information written on the product label and that includes the product identification code, wherein the individual product code management server includes:

an individual product code transmitter configured to transmit an unused individual product code in compliance with the obtaining request by the individual product code requester of the label attaching apparatus; and an individual product code distribution information storer configured to store individual product code distribution information therein, the individual product code distribution information matching the apparatus number, submitted by the individual product code requester and indicating the label attaching apparatus, with the individual product code transmitted by the individual product code transmitter.

2. The code management system according to claim 1, wherein the label attaching apparatus further includes:

a product label related information transmitter configured to transmit, in compliance with a request for history information of the product by submitting the product identification code of the product from a terminal apparatus, the product label related information, including the product identification code, to the individual product code management server through the communication network, and wherein the individual product code management server further includes:

a history information obtaining requester configured to submit the request for history information by transmitting the submitted product identification code to the corresponding label attaching apparatus when the request for the history information of the product from the terminal apparatus is received through the communication network; and a history information provider configured to provide the product label related information transmitted by the product label related information transmitter as part or all of the history information to the terminal apparatus.

3. The code management system according to claim 1, wherein the individual product code transmitter transmits a plurality of individual product codes all at once, and wherein the product identification code determiner is configured to determine that any one of unused individual product codes among the plurality of individual product codes obtained all at once by the individual product code obtainer is assigned to the product as the product identification code.

4. The code management system according to claim 1 further comprising:
a product information server configured to manage product information including unit price of the product,
wherein the label attaching apparatus further includes:
a case code reader configured to read a case code written on a case in which goods intended to be the product are contained;
a product information requester configured to submit an obtaining request of the product information to the product information server by submitting the case code read by the case code reader;
a product information obtainer configured to obtain the product information from the product information server through the communication network;
a goods cutter configured to cut the goods into one or more products;
a weigher configured to weigh the product cut by the goods cutter; and
a price calculator configured to calculate a price based on the unit price of the product indicated by the product information obtained by the product information obtainer and a weighing result by the weigher,
wherein the product label attacher attaches the product label on which the price that is calculated by the price calculator is written on the product package, and
wherein the product label related information storer stores the product label related information including the price that is calculated by the price calculator.

5. The code management system according to claim 4, wherein the case code is a production code by which production information of the goods intended to be the product can be identified.

6. The code management system according to claim 1, wherein the product includes a meat product that a subprimal of an individual food animal is dressed, a dressed meat product that includes a plurality of individual food animals, a seafood product that marine products are cut or divided, a greengrocery product that fruits and vegetables are cut or divided, and a beverage product that beverage is divided into a beverage container.

7. The code management system according to claim 1, wherein the individual product code transmitter transmits a plurality of individual product codes all at once, and
wherein the product identification code determiner is configured to determine that unused individual product codes among the plurality of individual product codes obtained all at once by the individual product code obtainer are assigned to a plurality of products as the product identification codes.

8. The code management system according to claim 1, the individual product code transmitter transmits the plurality of individual product codes all at once in response to a single one of the obtaining request.

* * * * *